United States Patent
Gilley et al.

(10) Patent No.: US 10,086,674 B2
(45) Date of Patent: Oct. 2, 2018

(54) AIR CONDITIONING SYSTEM HAVING CYLINDRICAL HEAT EXCHANGERS

(71) Applicant: DENSO International America, Inc., Southfield, MI (US)

(72) Inventors: Adam Gilley, Detroit, MI (US); Patrick Powell, Farmington Hills, MI (US); Mike Bima, Milford, MI (US)

(73) Assignee: DENSO International America, Inc., Southfield, MI (US)

( * ) Notice: Subject to any disclaimer, the term of this patent is extended or adjusted under 35 U.S.C. 154(b) by 453 days.

(21) Appl. No.: 14/851,011

(22) Filed: Sep. 11, 2015

(65) Prior Publication Data

US 2017/0072766 A1   Mar. 16, 2017

(51) Int. Cl.
| | |
|---|---|
| F28D 11/02 | (2006.01) |
| B60H 1/00 | (2006.01) |
| F28F 5/02 | (2006.01) |
| F28D 1/04 | (2006.01) |
| F28D 1/047 | (2006.01) |
| F28D 11/04 | (2006.01) |
| F25B 39/02 | (2006.01) |
| F28F 5/04 | (2006.01) |
| F28D 21/00 | (2006.01) |
| F28D 1/02 | (2006.01) |

(52) U.S. Cl.
CPC ..... B60H 1/00021 (2013.01); B60H 1/00328 (2013.01); B60H 1/00335 (2013.01); F25B 39/02 (2013.01); F28D 1/047 (2013.01); F28D 1/0426 (2013.01); F28D 11/025 (2013.01); F28D 11/04 (2013.01); F28F 5/02 (2013.01); B60H 2001/0035 (2013.01); F28D 2001/0273 (2013.01); F28D 2021/0085 (2013.01); F28D 2021/0096 (2013.01); F28F 5/04 (2013.01); F28F 2250/08 (2013.01)

(58) Field of Classification Search
CPC ......... F28D 11/025; F28D 11/02; F28D 11/04
See application file for complete search history.

(56) References Cited

U.S. PATENT DOCUMENTS

| | | | | |
|---|---|---|---|---|
| 1,739,314 A | * | 12/1929 | Karmazin | F28D 11/025 164/270.1 |
| 2,056,023 A | * | 9/1936 | Stevenson, Jr. | F25B 3/00 165/90 |
| 2,789,794 A | * | 4/1957 | Moore | B60H 1/00021 165/43 |
| 2,813,698 A | * | 11/1957 | Lincoln | F28D 15/0208 165/101 |
| 2,874,940 A | * | 2/1959 | Ahlen | F22D 1/006 165/90 |
| 3,304,990 A | * | 2/1967 | Ontko | B01D 3/08 159/1.1 |

(Continued)

Primary Examiner — Ljiljana Ciric
Assistant Examiner — Alexis Cox
(74) Attorney, Agent, or Firm — Harness, Dickey & Pierce, P.L.C.

(57) ABSTRACT

An air conditioning system having a compact configuration may include an evaporator and a heater core that have a cylindrical shape. The evaporator defines a cavity. The heater core is positioned within the cavity such that the evaporator and the heater core are coaxially positioned with each other about a center axis. The heater core is configured to rotate about the center axis to draw in air.

13 Claims, 6 Drawing Sheets

(56) References Cited

U.S. PATENT DOCUMENTS

| | | | | | |
|---|---|---|---|---|---|
| 3,332,253 | A | * | 7/1967 | Alexander | F25B 3/00 62/499 |
| 3,397,739 | A | * | 8/1968 | Miller | F25B 3/00 165/122 |
| 3,618,915 | A | * | 11/1971 | Heinemann | F27B 7/40 165/88 |
| 4,131,157 | A | * | 12/1978 | Laing | F28D 11/04 165/121 |
| 4,206,805 | A | * | 6/1980 | Beckett | F04B 39/06 165/169 |
| 4,356,705 | A | * | 11/1982 | Sutoh | B60H 1/3211 236/91 F |
| 4,476,773 | A | * | 10/1984 | Fehr | B60H 1/00471 137/625.47 |
| RE32,169 | E | * | 6/1986 | Piotrowski | F04D 3/02 165/89 |
| 4,717,338 | A | * | 1/1988 | Cellier | F28F 5/02 219/469 |
| 4,920,927 | A | * | 5/1990 | Tsusaka | F01P 3/18 123/41.42 |
| 4,934,448 | A | * | 6/1990 | Uemura | F28D 11/02 165/121 |
| 4,993,487 | A | * | 2/1991 | Niggemann | F25B 39/00 165/163 |
| 2005/0006059 | A1 | * | 1/2005 | Tarasinski | F28D 11/02 165/90 |
| 2010/0090476 | A1 | * | 4/2010 | Wada | F01C 11/006 290/1 A |
| 2012/0019010 | A1 | * | 1/2012 | Nakamura | F01C 1/0215 290/1 R |
| 2013/0199164 | A1 | * | 8/2013 | Levin | F01N 5/02 60/299 |
| 2016/0040945 | A1 | * | 2/2016 | Sahay | F28D 1/05316 165/109.1 |
| 2016/0138815 | A1 | * | 5/2016 | Swett | F24F 1/027 62/115 |
| 2017/0244306 | A1 | * | 8/2017 | Lin | H02K 9/20 |
| 2017/0248347 | A1 | * | 8/2017 | Miller | F25B 3/00 |

* cited by examiner

FIG-6

AIR CONDITIONING SYSTEM HAVING CYLINDRICAL HEAT EXCHANGERS

FIELD

The present disclosure relates to vehicle heating, ventilation and air conditioning (HVAC) system.

BACKGROUND

This section provides background information related to the present disclosure which is not necessarily prior art. Vehicles are known to incorporate a heating, ventilation, and air conditioning (HVAC) system to heat and/or cool air blown through the HVAC system using a heater core and an evaporator. The heater core and the evaporator are heat exchangers that are disposed within an HVAC housing. The heater core can utilize engine coolant as a source of heat for heating the air, and the evaporator can utilize refrigerant for cooling the air.

The air blown through the HVAC system is drawn in via a blower fan which is positioned within the HVAC housing. The blower fan draws in air from outside or inside (recirculate) the vehicle. The air then flows through the HVAC system where it is heated by the heater core and/or cooled by the evaporator before flowing to the passenger compartment of the vehicle through one or more outlet vents.

A control module may control the temperature of the air provided to the passenger compartment by regulating the cooling and heating performed by the evaporator and the heater core. For example, to regulate a cooling operation, a control module controls the amount of refrigerant entering the evaporator, and to regulate a heating operation, the control module may control the amount of air entering the heater core by way of doors positioned along an air flow path toward the heater core. The HVAC housing also defines areas in which cool air from the evaporator and hot air from the heater core can be mixed before entering the passenger compartment.

Due to the arrangement of the blower fan, the evaporator, the heater core, and the air mix area, the size of the HVAC housing can become an issue. More particularly, the HVAC system is typically positioned behind a dashboard of the vehicle to access the outlet vents within the passenger compartment. Such a location is typically congested with various other devices and systems, and leaves little space for the HVAC system.

SUMMARY

The present disclosure is directed toward an air conditioning system for a vehicle that has a compact configuration. The air conditioning system includes an evaporator and a heater core each having a cylindrical body. The evaporator defines a cavity within which the heater core is positioned. More particularly, the evaporator and the heater core are coaxially positioned with each other about a center axis. The heater core is configured to rotate within the evaporator to draw air from the outside.

The air conditioning system of the present disclosure may provide a compact design in which the heater core is configured to draw air into the system in lieu of a blower fan. In addition, the air provided to a passenger compartment of the vehicle may be conditioned as it flows through the heater core and the evaporator, thereby reducing or eliminating the need of separate air mix areas.

Further areas of applicability of the present disclosure will become apparent from the detailed description, the claims, and the drawings. The detailed description and specific examples are intended for purposes of illustration only, and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
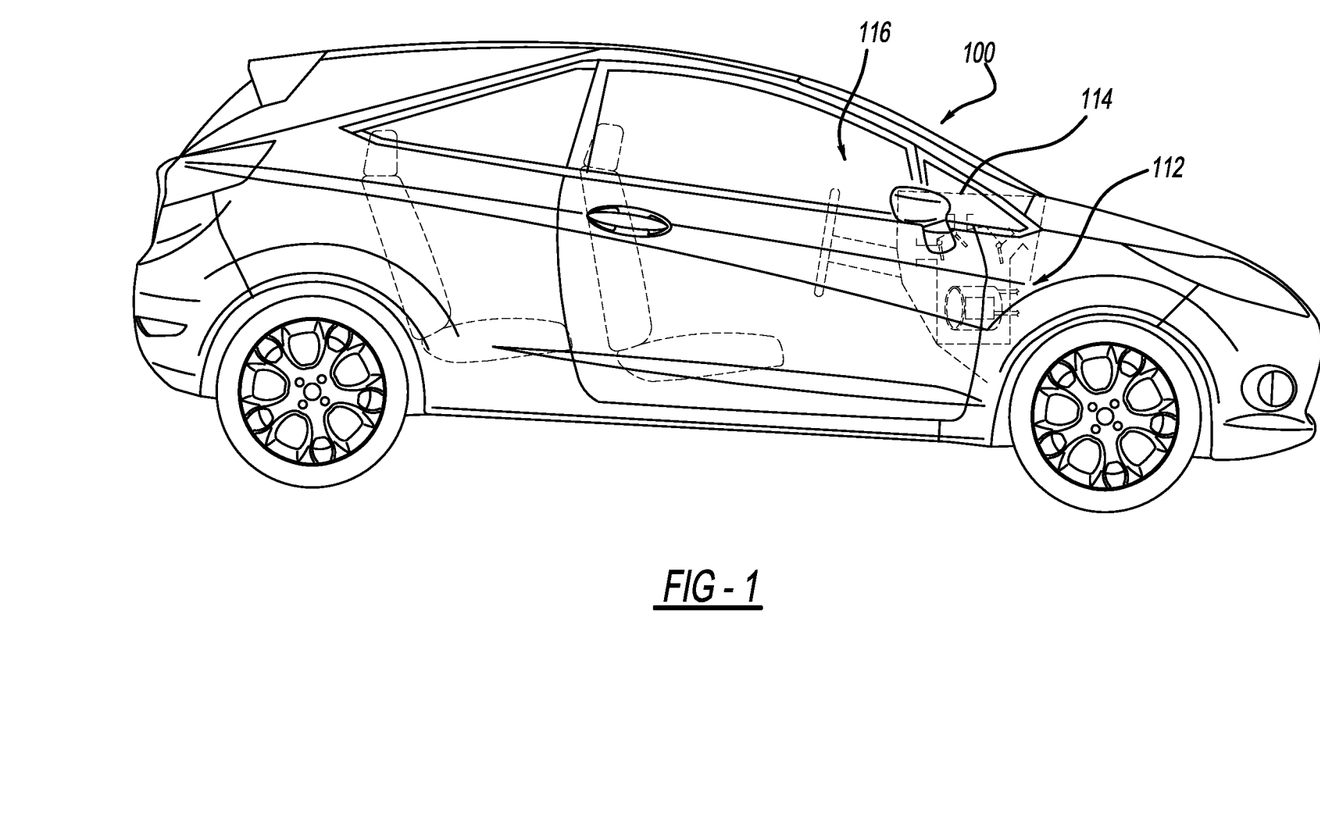
FIG. 1 is side view of a vehicle having a heating, venting, and air conditioning (HVAC) system in accordance with the present disclosure.

With reference to FIG. 1, a vehicle 100 includes a heating, ventilation, and air conditioning (HVAC) system 112 of the present disclosure. The HVAC system 112 is disposed within an engine compartment of the vehicle 100 and is positioned behind a dashboard 114 of the vehicle 100. The HVAC system 112 heats and/or cools air within a passenger compartment 116 of the vehicle 100 by way of a heat cycle and a refrigeration cycle, respectively. The HVAC system 112 may operate in various modes to condition the air in the passenger compartment 116, and it is not limited to only heating and cooling. For example, the HVAC system 112 may dehumidify, defrost, and/or recirculate air.

Figure 2:
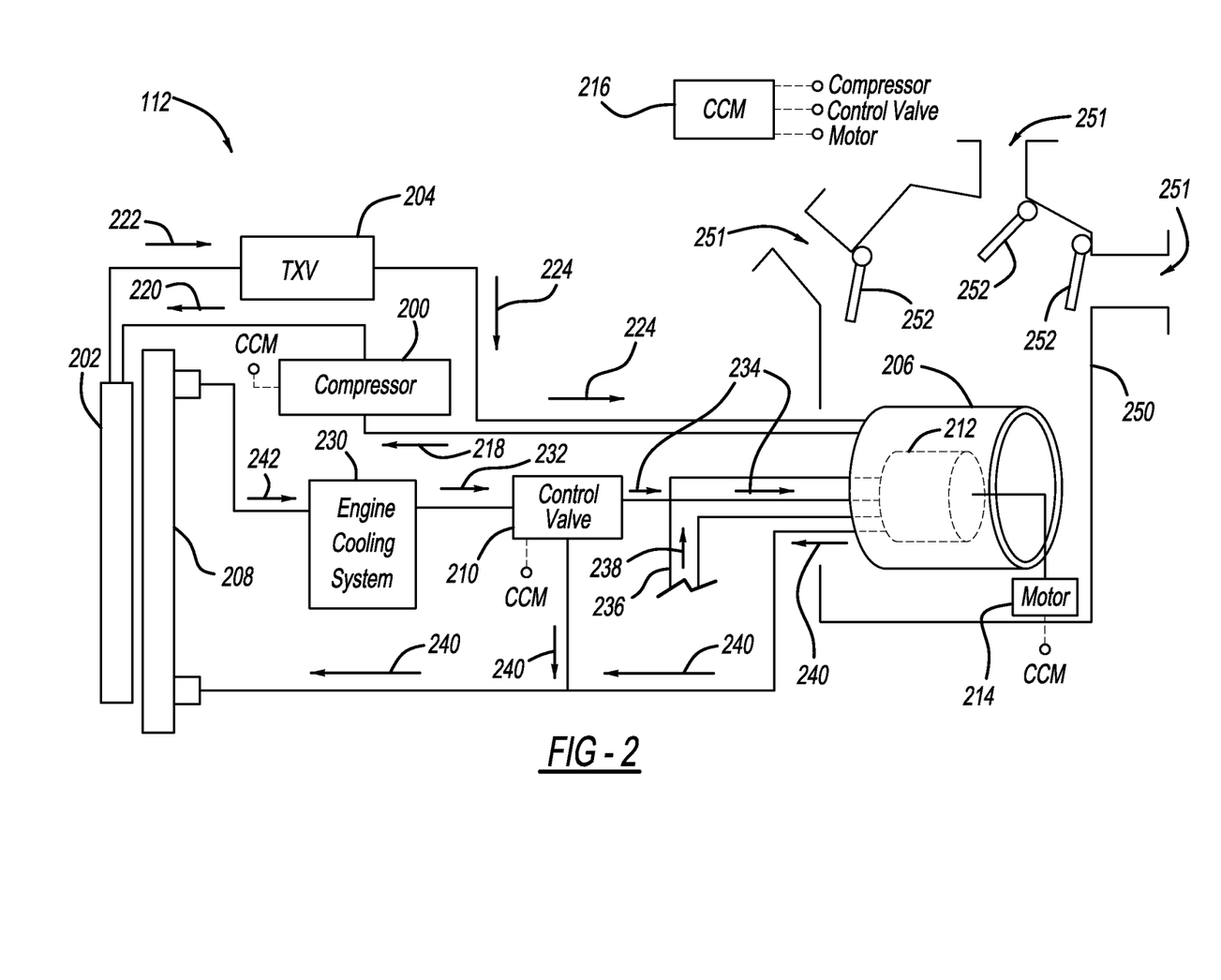
FIG. 2 is a schematic of a cooling operation and a heating operation of the HVAC system.

With reference to FIG. 2, the HVAC system 112 includes a compressor 200, a condenser 202, a thermal expansion valve (TXV) 204, an evaporator 206, a radiator 208, a control valve 210, a heater core 212, a motor 214, and a climate control module (CCM) 216. The compressor 200, the condenser 202, the TXV 204, and the evaporator 206 operate to provide cool air to the passenger compartment 116 (i.e., refrigeration cycle). The radiator 208, the control valve 210, and the heater core 212 operate to provide hot air the passenger compartment (i.e., heat cycle).

During the refrigeration cycle, refrigerant (e.g., a first fluid) from the evaporator 206 enters the compressor 200 (arrow 218). The compressor 200 compresses the refrigerant to increase the temperature of the refrigerant. From the compressor 200, the vapor refrigerant flows to the condenser 202 (arrow 220). The condenser 202 is a heat exchanger that transfers heat from the fluid flowing through to the air blowing through the condenser 202. Accordingly, air blowing through the condenser 202 cools the hot vapor refrigerant back to liquid form.

Refrigerant from the condenser 202 flows to the TXV 204 (arrow 222), where the refrigerant is decompressed and expanded before being supplied to the evaporator 206 (arrows 224). The TXV 204 may also be referred to as a first valve. The evaporator 206 is a heat exchanger that absorbs heat from air blowing through the evaporator 206. Specifically, the refrigerant flowing through the evaporator 206 absorbs heat from the air to cool the air before it enters the passenger compartment 116. The air is drawn in and directed toward the evaporator 206 by way of the heater core 212 and the motor 214, as described below.

During the heat cycle, the HVAC system 112 utilizes fluid from an engine cooling system 230 to heat air for the passenger compartment 116. Specifically, fluid, such as water and/or coolant (e.g., a second fluid), travels through passages defined within the walls of the engine to absorb heat from the engine. Fluid from the engine cooling system 230 travels to the heater core 212 by way of the control valve 210 (arrows 232 and 234). The control valve 210 controls the amount of fluid entering the heater core 212, as described in detail below. The control valve 210 may be an electromagnetic valve and may be referred to as a second valve.

The heater core 212 is a heat exchanger that transfers heat from the fluid flowing through the heater core 32 to air blowing through the heater core 212. Specifically, an air duct 236 supplies outside or inside (recirculated) air to the heater core 212 (arrows 238) and the motor 214 rotates the heater core 212 to draw the air from the air duct 236, as described further below. The air flows through the heater core 212, where it is heated by the fluid flowing through the heater core 212 and then flows towards the passenger compartment 116. From the heater core 212 and/or the control valve 210, fluid travels to the radiator 208 (arrows 240). As a heat exchanger, the radiator 208 further cools the fluid before providing it to the engine cooling system 230 (arrow 242).

The CCM 216 controls the operation of various components within the HVAC system 112 to condition the air to a desired temperature. For example, the CCM 216 controls the operation of the compressor 200 and the control valve 210 to control the amount of fluid entering the evaporator 206 and the heater core 212, respectively. The CCM 216 further controls the rotational speed of the heater core 212 by way of the motor 214. The dashed lines in the figures are control lines from the CCM 216 to various components of the HVAC system 112. The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The module may include one or more interface circuits. In some examples, the interface circuits may include wired or wireless interfaces that are connected to a local area network (LAN), the Internet, a wide area network (WAN), or combinations thereof.

The evaporator 206, the heater core 212, and the motor 214 are located in a housing 250. The housing 250 is disposed behind a dashboard or instrument panel. Air conditioned by the evaporator 206 and/or the heater core 212 exits the housing 250 via openings 251 and enters the passenger compartment 116 by way of vents located in the passenger compartment 116. The amount of air entering the passenger compartment 116 is controlled via one or more doors 252.

Figure 3A:
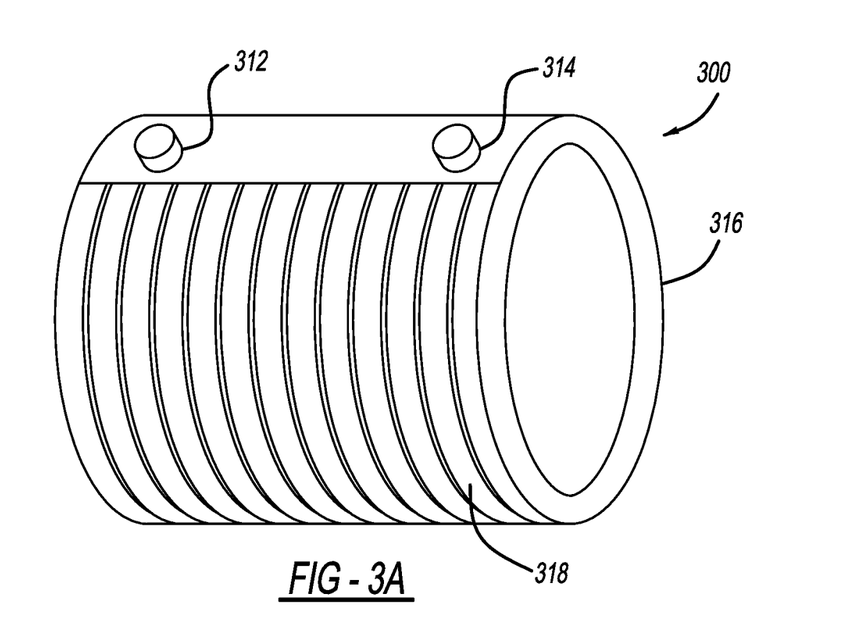
FIGS. 3A and 3B illustrate cylindrical heat exchangers.
Figure 3B:
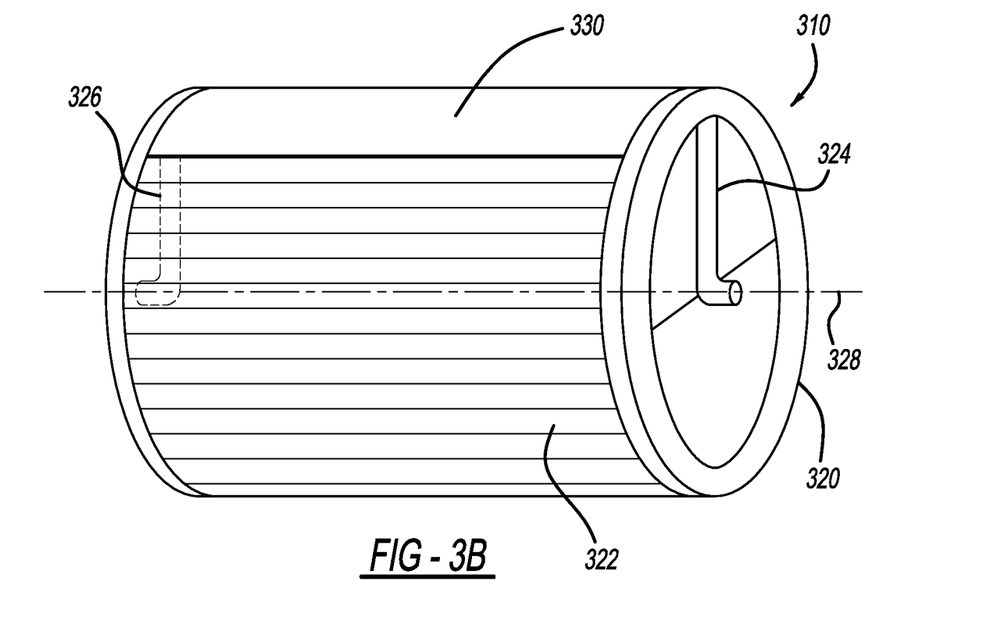

The evaporator 206 and the heater core 212 are heat exchangers that have a cylindrical shape. As an example, FIGS. 3A and 3B illustrate cylindrical heat exchangers 300 and 310, respectively. The heat exchanger 300 includes an inlet port 312 and an outlet port 314 for receiving and discharging fluid. The heat exchanger 300 includes a cylindrical body 316 and tubes 318 that are wrapped circumferentially around the cylindrical body 316. The heat exchanger 310 includes a cylindrical body 320 and tubes 322 that are wrapped longitudinally in a serpentine manner around the cylindrical body 320. The heat exchanger 310 includes an inlet conduit 324 and an outlet conduit 326 that extend from a center axis 328 of the heat exchanger to a header tank 330. As described in detail below, the inlet conduit 324 and the outlet conduit 326 may be utilized with a heat exchanger that is to rotate about the center axis 328. In lieu of the inlet port 312 and the outlet port 314, the heat exchanger 300, having circumferentially wrapped tubes 318, may have an inlet conduit and an outlet conduit. Similarly, the heat exchanger 310, having the longitudinal tubes 322, may have an inlet port and an outlet port instead of the inlet conduit and the outlet conduit. While two examples of cylindrical heat exchangers are illustrated, other suitable types of cylindrical heat exchangers may be used.

Figure 4A:
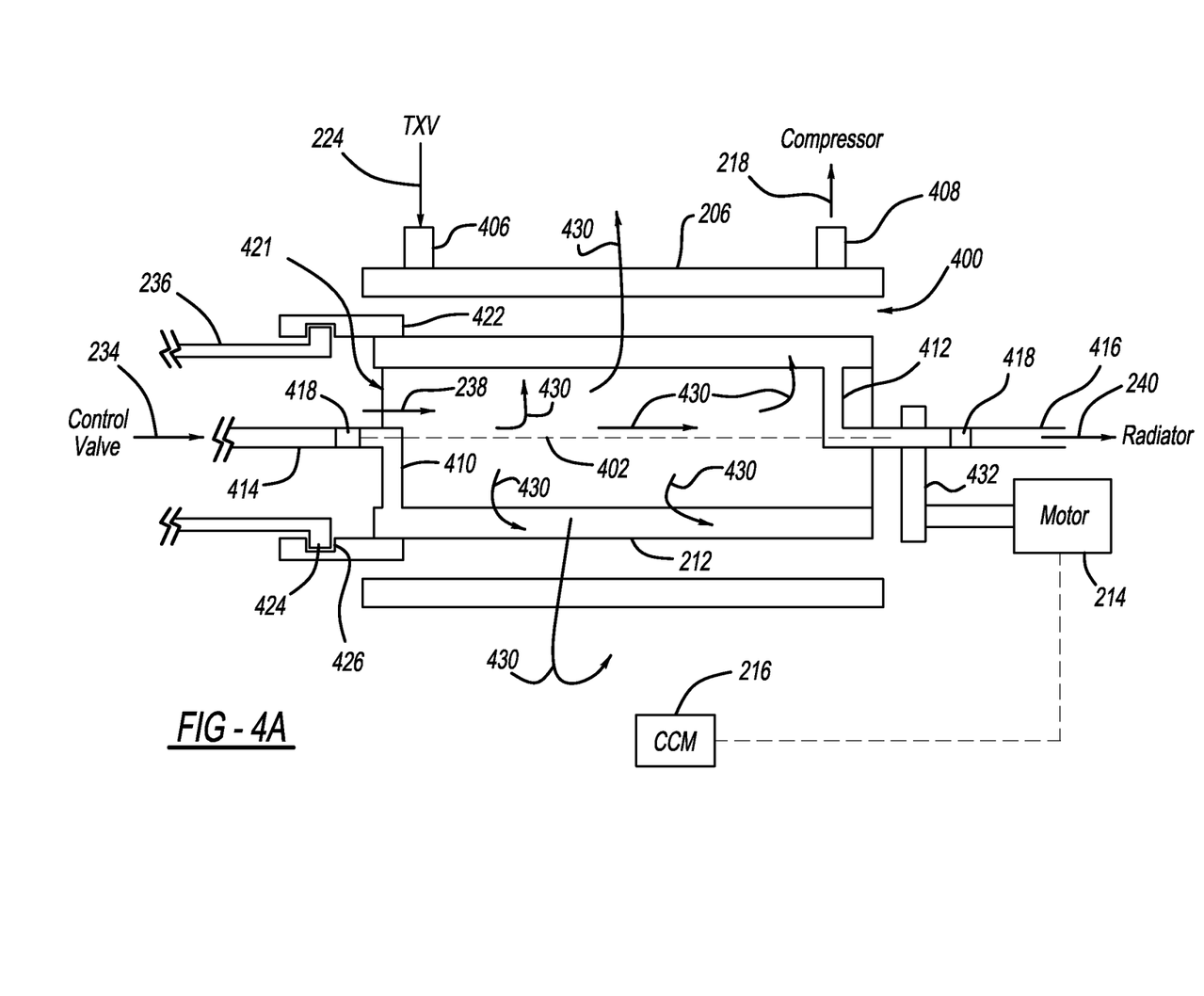
FIG. 4A is a partial cross-sectional view of a cylindrical evaporator and a cylindrical heater core of the HVAC system in a first embodiment.
Figure 4B:
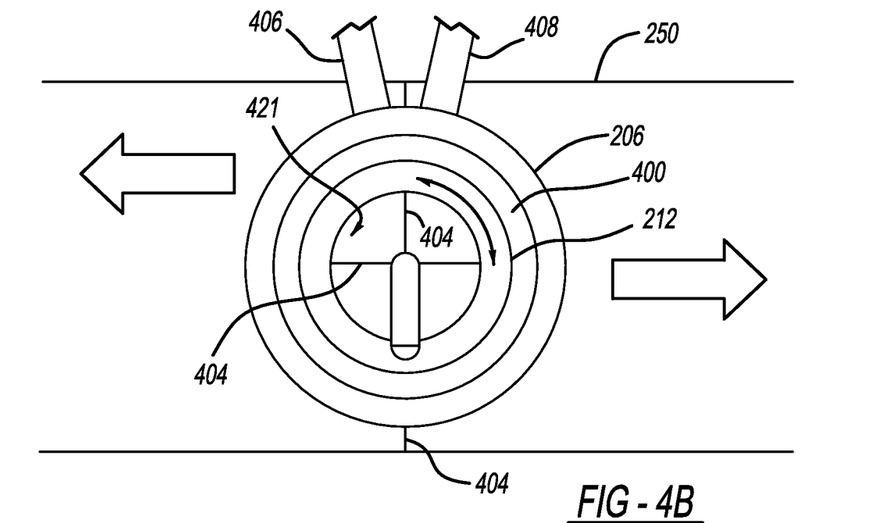
FIG. 4B is a side view of the cylindrical evaporator and the cylindrical heater core disposed within the cylindrical evaporator.

With reference to FIGS. 4A and 4B, the evaporator 206 houses the heater core 212 within a cavity 400 defined by the evaporator 206. The evaporator 206 and the heater core 212 are coaxially disposed with respect to a center axis 402. The evaporator 206 and the heater core 212 are positioned within and supported by the housing 250 via one or more brackets 404. The evaporator 206 is stationary and the heater core 212 is configured to rotate within the evaporator 206.

The evaporator 206 includes an inlet 406 and an outlet 408. The inlet 406 receives cold fluid from the TXV 204, and the outlet 408 discharges heated fluid to the compressor 200 of the HVAC system 112 by way of fluid hoses (not shown). As described herein, the heater core 212 rotates and pushes air through the evaporator 206. The air flowing through the evaporator 206 is cooled by the fluid flowing through the evaporator 206.

The heater core 212 includes an inlet conduit 410 and an outlet conduit 412, which are collectively referred to as conduits 410 and 412. The inlet conduit 410 receives hot fluid from the engine cooling system 230 by way of the control valve 210. The outlet conduit 412 discharges cooled fluid to the radiator 208. The conduits 410 and 412 extend from a surface of the heater core 212 to the center axis 402, such that a portion of the conduits 410 and 412 is parallel with the center axis 402. The inlet conduit 410 is coupled to the control valve 210 by way of an inlet hose 414, and the outlet conduit 412 is coupled to the radiator 208 by way of an outlet hose 416. The conduits 410 and 412 are coupled to the inlet hose 414 and the outlet hose 416 by way of rotating sealed joints 418, respectively. The joints 418 prevent fluid from leaking while allowing the heater core 212 to rotate and maintaining the hoses 414 and 416 in a stationary position (i.e., the hoses 414 and 416 do not rotate).

The air duct 236 is coupled to at least one end of the heater core 212 to supply fresh or recirculated air to the HVAC system 112. More particularly, the air duct 236 supplies air to a bore 421 defined by the heater core 212. As an example, FIG. 4A illustrates the air duct 236 positioned at an inlet side of the heater core 212. The air duct 236 is attached to the heater core 212 by way of a connector 422. The air duct 236 and the connector 422 are configured such that the connector 422 rotates with the heater core 212 and the air duct 236 remains stationary. As an example, the air duct 236 may have a lip 424 that is positioned within a groove 426 defined by the connector 422. The lip 424 and the groove 426 are configured to allow the lip 424 to remain stationary within the groove 426 with the connector 422 rotating with the heater core 212. The air duct 236 and the connector 422 may be configured in various suitable ways to prevent the air duct 236 from rotating and are not limited to the example illustrated. For example, the air duct 236 may be connected to the heater core 212 with a felt seal disposed between the air duct 236 and the heater core 212. The felt seal allows rotation of the heater core 212 while maintaining a stationary air duct 236. In addition, while the air duct 236 is illustrated as being attached to the inlet side of the heater core 212, the air duct 236 may also be disposed at the outlet side of the heater core 212 or both the inlet side and the outlet side.

With the air duct 236 coupled to an end of the heater core 212, the air duct 236 interfaces with the inlet hose 414. More particularly, a portion of the inlet hose 414 is positioned within the air duct 236. The inlet hose 414 may enter the air duct 236 via a connector (not shown) that secures the position of the inlet hose 414 as it enters the air duct 236 and seals the interface to prevent or minimize the amount of air leakage.

The motor 214 is coupled to the heater core 212 by way of an armature 432. The motor 214 may be an electric motor, such as a servo motor, that includes a series of gears for rotating the heater core 212. In the example embodiment, the armature 432 couples to the outlet conduit 412 along the center axis 402. Alternatively, the armature 432 may be connected to the heater core 212 by way of another suitable shaft-like structure along the center axis 402. More particularly, the motor 214 is configured to couple to the heater core 212 along the center axis 402, so that the shaft rotates about the center axis 402 and does not move along a circumference of the heater core 212.

The motor 214 may rotate the heater core 212 clockwise or counter clockwise. As the heater core 212 rotates, the heater core 212 draws in air from the air duct 236 to the bore 421. The CCM 216 regulates the flow of air by controlling a rotational speed of the heater core 212. As an example, the CCM 216 transmits an electrical pulse, such as pulse width modulated signal, to the motor 214 to control the rotational movement generated by the motor 214. To increase the air flow, the CCM 216 increases the rotational movement of the motor 214, thereby increasing the rotational speed of the heater core 212. Conversely, to decrease the air flow, the CCM 216 decreases the rotational movement provided by the motor 214, thereby decreasing the rotational speed of the heater core 212. The CCM 216 may include predetermined algorithms and programs that correlate a desired air flow amount that is set by a user with a requisite rotational speed of the heater core 212 and rotational output of the motor 214.

Figure 5A:
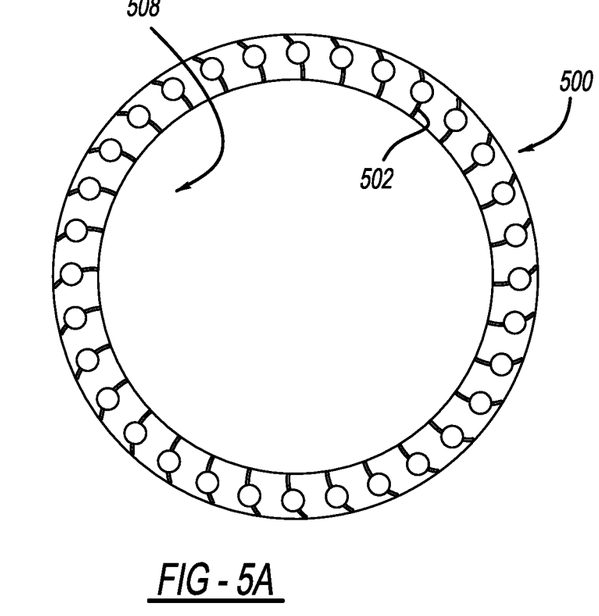
FIGS. 5A and 5B illustrate a heat exchanger having a scroll shaped fin.
Figure 5B:
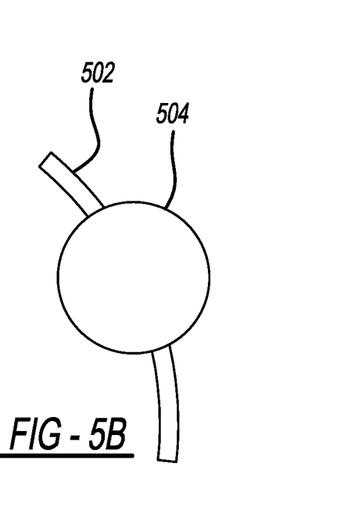

To draw the air from the air duct 236, the heater core 212 includes scroll shaped fins. As an example, FIG. 5A illustrates a cross-section of a cylindrical heat exchanger 500 that can be used as the heater core 212. The heat exchanger 500 includes scroll shaped fins 502 coupled to tubes 504. The scroll shaped fins 502 have a curve-like contour and are made of a thermal conducting material, such as aluminum. As illustrated in FIG. 5B, the scroll shaped fines 502 extend outward from an outer surface 506 of the tube 504.

With the scroll shaped fins 502, the heater core 212 draws in air in a similar manner as a centrifugal fan. For instance, as illustrated by arrows 430 in FIG. 4A, air enters through the bore 421 (i.e., bore 508 of FIG. 5) of the heater core 212 and is turned at about 90 degrees towards the evaporator 206. The air accelerates due to centrifugal force as it flows over the scroll shaped fins 502 (not shown in FIG. 4A) and blows toward and flows through the evaporator 206 and then toward the openings 251 of the housing 250.

In addition to controlling the flow of air through the heater core 212 and the evaporator 206, the scroll shaped fins 502 absorb heat from fluid flowing through the tubes 502. Accordingly, as air is drawn in by the fins 502, the air is heated by the fins 502 before flowing through the evaporator 206. Thus, by having the scroll shaped fins 502, the heater core 212 operates as a centrifugal fan for drawing in air and as a heat exchanger for transferring heat to the air flowing through the fins 502.

The CCM 216 receives inputs from various devices such as sensors disposed in the passenger compartment 116 and one or more human interface devices operable by a user. Based on the inputs received and control algorithms stored within a memory of the CCM 214, the CCM 216 conditions the air entering the passenger compartment 116 by controlling the compressor 200, the control valve 210, and the motor 214. Specifically, the CCM 216 controls the cooling and heating capabilities of the evaporator 206 and the heater core 212 by adjusting the amount of fluid entering the heat exchangers by way of the compressor 200 and the control value 210, respectively. As provided above, the CCM 216 adjusts the rate of flow of the air through the passenger compartment 116 by controlling the rotational speed of the heater core 212 via the motor 214.

During a cooling mode of the HVAC 112, if the air is to be at the lowest temperature, the CCM 216 controls the compressor 200 to allow refrigerant to flow to the evaporator 206 and sets the control value 210 in a closed state to prevent fluid from the engine cooling system 230 from entering the heater core 212. By preventing fluid from flowing through the heater core 212, air is not heated by the heater core 212 and is only drawn and directed toward the evaporator 206, where it is cooled. Based on the desired temperature, if the air is to be slightly heated, the CCM 216 may reduce the amount of refrigerant entering the evaporator 206 and/or allow a controlled amount of fluid from the engine cooling system 230 to flow through the heater core 212.

During a heat mode of the HVAC system 112, if the air is to be at the highest temperature, the CCM 216 controls the control value 210 to have fluid from the engine cooling system 230 flow through the heater core 212 and sets the compressor 200, such that fluid (i.e., refrigerant) is prevented from flowing through the evaporator 206 from the TXV 204. The heater core 212 draws in and heats the air before it flows to the passenger compartment 116. With no refrigerant flowing therein, the evaporator 206 does not cool the air as it travels the from the heater core 212 toward the passenger compartment 116. Based on the desired temperature, if the air is to be slightly cooled, the CCM 216 may reduce the amount of fluid entering the heater core 212 and/or allow a controlled amount of refrigerant to flow through the evaporator 206. Accordingly, the CCM 216 controls the temperature of the air by controlling the amount of fluid that flows through the evaporator 206 and the heater core 212.

The HVAC system 112 of the present disclosure includes a compact evaporator-heater core subsystem for conditioning air for the passenger compartment 116. Unlike conventional HVAC systems for a vehicle, the HVAC system 112 does not require a large housing having one or more areas in which cool air from the evaporator is mixed with warm air from the heater core. The HVAC system 112 controls the temperature of the air by controlling the flow of fluid through the evaporator 206 and the heater core 212. Air may be conditioned by the heater core 212 before it flows into the evaporator 206, where it may be further conditioned.

Furthermore, the HVAC system 112 does not require a separate blower fan for drawing air into the heat exchangers. Specifically, the heater core 212 is rotatable by the motor 214 and includes scroll shaped fins that draw in air from an air duct. Accordingly, the heater core 212 and the motor 214 operate as a blower fan for drawing in air through the heater core 212 and the evaporator 206.

Figure 6:
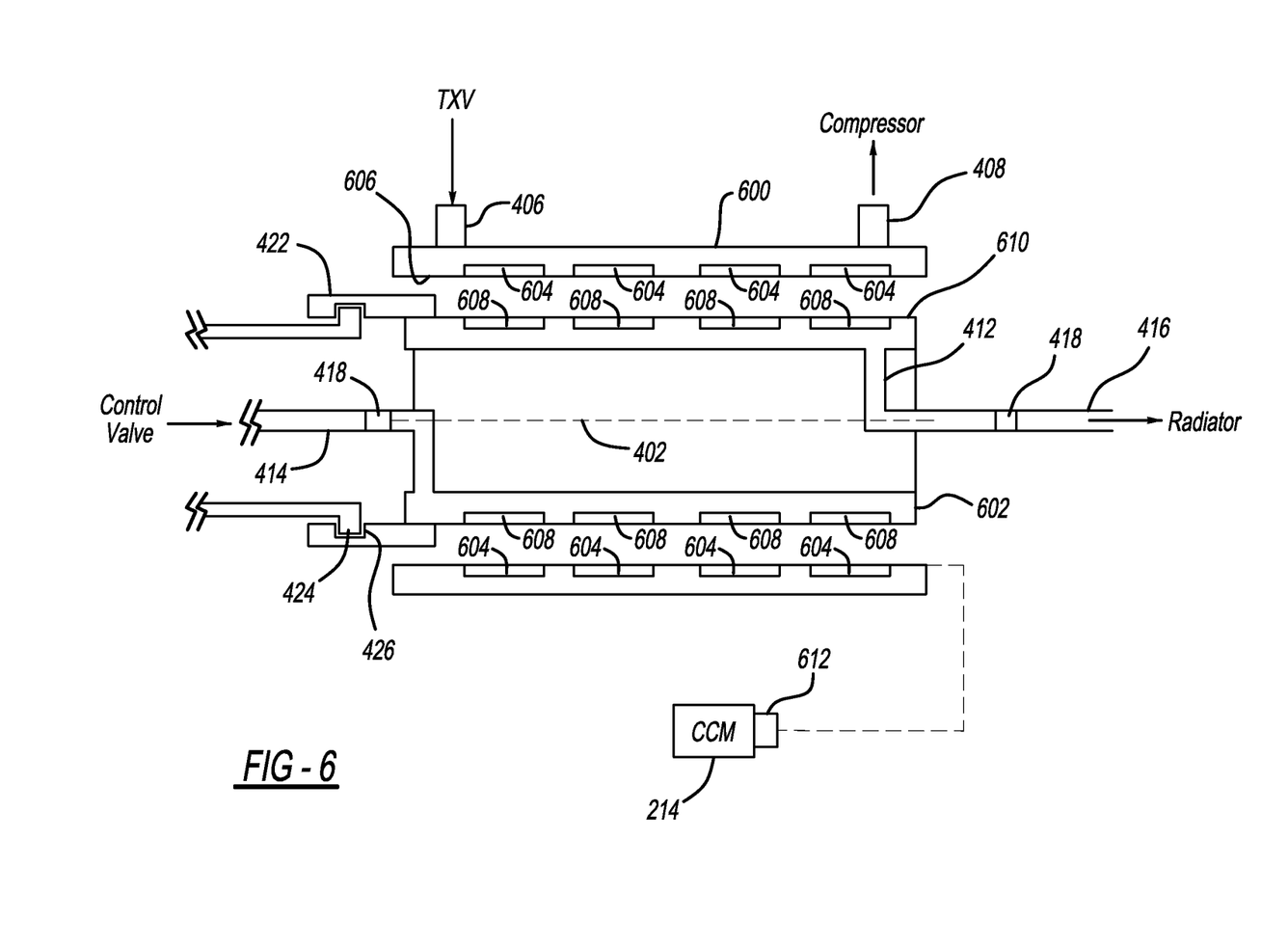
FIG. 6 is a partial cross-sectional view of a cylindrical evaporator and a cylindrical heater core of the HVAC system in a second embodiment.

In the first embodiment, the HVAC system 112 includes the motor 214 for rotating the heater core 212. Alternatively, as illustrated in FIG. 6, the HVAC system 112 may include an evaporator 600 and a heater core 602. The evaporator 600 includes multiple magnets 604 disposed along an inner surface 606 of the evaporator 600. The heater core 602 includes multiple electromagnets 608 disposed along an outer surface 610 of the heater core 602. The magnets 604 are arranged to align with respective electromagnets 608. The magnets 604 and the electromagnets 608 may be embedded along surfaces of the evaporator 600 and heater core 602, respectively. Alternatively, the magnets 604 and the electromagnets 608 may be attached to respective surfaces of the evaporator 600 and heater core 602. While in the example embodiment the electromagnets are disposed with the heater core, the electromagnets may be disposed with the evaporator and the magnets may be disposed with the heater core.

The evaporator 600 and the heater core 602 operate in a similar manner as an electromagnetic motor. Specifically, the CCM 216 may include a driver 612 that outputs a current pulse to the electromagnets 608 for turning ON and OFF an electromagnetic field. The ON/OFF actuation of the electromagnets 608 causes attracting and repelling forces that rotate the heater core 602 via the electromagnetic field. By having the evaporator 600 and heater core 602, the HVAC system 112 no longer requires the motor 214 for rotating the heater core 602.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. An air conditioning system comprising:
   an evaporator having a cylindrical body and defining a cavity;
   a heater core having a cylindrical body and positioned within the cavity of the evaporator, wherein the evaporator and the heater core are coaxially positioned with each other about a center axis; and
   a motor coupled to the heater core, wherein the motor rotates the heater core about the center axis.

2. The air conditioning system of claim 1 wherein the heater core includes multiple tubes and scroll shaped fins attached to an outer surface of the tubes.

3. The air conditioning system of claim 2 wherein the heater core is fluidly coupled to an air duct and draws in air from the air duct by way of the scroll shaped fins.

4. The air conditioning system of claim 1 further comprising:
   a climate control module controlling the motor to adjust a rotational speed of the heater core.

5. The air conditioning system of claim 1 further comprising:
   a first valve controlling flow of a first fluid to the evaporator, wherein the evaporator transfers heat from air flowing through the evaporator to the first fluid; and
   a second valve controlling flow of a second fluid to the heater core, wherein the heater core transfers heat from the second fluid to air flowing through the heater core.

6. The air conditioning system of claim 1 further comprising:
   a climate control module controlling flow of air through the heater core and the evaporator by controlling a rotational speed of the heater core by way of the motor.

7. The air conditioning system of claim 1 wherein the heater core includes an inlet conduit and an outlet conduit that partially extend along the center axis.

8. The air conditioning system of claim 1 wherein the heater core includes an inlet conduit and an outlet conduit configured to attach to an inlet hose and an outlet hose along the center axis, respectively.

9. An air conditioning system for a vehicle comprising:
   an evaporator having a cylindrical body and defining a cavity;
   a heater core having a cylindrical body and positioned within the cavity of the evaporator and defining a bore, wherein the evaporator and the heater core are coaxially positioned with each other about a center axis, and the heater core draws in air through the bore and directs the air outward toward the evaporator;
   a motor operable for rotating the heater core about the center axis; and
   a climate control module controlling a rotational movement outputted by the motor such that the climate control modules controls a rotational speed of the heater core by way of the motor, wherein the climate control module regulates air flow through the heater core and the evaporator via the motor.

10. The air conditioning system of claim 9 wherein the heater core is a heat exchanger that includes scroll shaped fins to draw in air through the bore as the heater core rotates.

11. The air conditioning system of claim 9 wherein the heater core is fluidly coupled to an air duct such that air flows through the air duct to the bore and outward toward the evaporator as the heater core rotates.

12. The air conditioning system of claim 9 further comprising;

a first valve controlling flow of a first fluid to the evaporator, wherein the evaporator transfers heat from air flowing through the evaporator to the first fluid; and a second valve controlling flow of a second fluid to the heater core, wherein the heater core is a heat exchanger that transfers heat from the second fluid to air flowing from the bore through the heater core.

13. The air conditioning system of claim 12 wherein:

the climate control module controls the second valve in a heating mode and a cooling mode, in the heating mode, an amount of the second fluid flowing to the heater core is greater than an amount of the first fluid flowing to the evaporator, and in the cooling mode, the amount of the first fluid flowing to the evaporator is greater than the amount of the second fluid flowing to the heater core.

\* \* \* \* \*